(12) United States Patent
Tu et al.

(10) Patent No.: US 8,566,911 B2
(45) Date of Patent: Oct. 22, 2013

(54) METHOD OF OBTAINING AUTHORIZATION FOR ACCESSING A SERVICE

(75) Inventors: Van Quy Tu, Kitchener (CA); Herbert Anthony Little, Waterloo (CA); Anthony Rosati, Ottawa (CA); Matthew John Campagna, Ridgefield, CT (US)

(73) Assignees: BlackBerry Limited, Waterloo (CA); Certicom Corp., Mississauga (CA)

( * ) Notice: Subject to any disclaimer, the term of this patent is extended or adjusted under 35 U.S.C. 154(b) by 265 days.

(21) Appl. No.: 12/899,282

(22) Filed: Oct. 6, 2010

(65) Prior Publication Data

US 2012/0089847 A1 Apr. 12, 2012

(51) Int. Cl.
 *H04L 29/06* (2006.01)
(52) U.S. Cl.
 USPC ................................. 726/4; 713/182; 455/411
(58) Field of Classification Search
 USPC ............................................................. 726/4
 See application file for complete search history.

(56) References Cited

U.S. PATENT DOCUMENTS

| 5,892,902 | A | 4/1999 | Clark |
| 6,052,785 | A | 4/2000 | Lin |
| 7,076,558 | B1 * | 7/2006 | Dunn ............................ 709/229 |
| 7,600,676 | B1 | 10/2009 | Rados |
| 7,606,560 | B2 | 10/2009 | Labrou |
| 8,014,756 | B1 * | 9/2011 | Henderson .................... 455/411 |
| 2005/0048951 | A1 | 3/2005 | Saito |
| 2005/0114674 | A1 | 5/2005 | Carley |
| 2009/0089882 | A1 | 4/2009 | Hofmann et al. |

FOREIGN PATENT DOCUMENTS

EP 2077501 A1 7/2009

OTHER PUBLICATIONS

Steele, Robert, and Kyongho Min. "HealthPass: Fine-grained Access Control to Portable Personal Health Records." 2010 24th IEEE International Conference on Advanced Information Neworking and Applications, 2010.*
Examination Report dated Nov. 4, 2011. In corresponding application No. 10186767.9.
The International Search Report and the Written Opinion of the International Searching Authority, or The Declaration mailed Dec. 16, 2011, in corresponding PCT patent application No. PCT/US2011/054754.
Examination Request mailed Jul. 10, 2012, in corresponding European patent application No. 10186767.9.
RSA Laboratories,"Wireless Access-Control Research Project (WARP)," online: <http://www.rsa.com/rsalabs/node.asp?id=3598>.

(Continued)

*Primary Examiner* — Taghi Arani
*Assistant Examiner* — Narciso Victoria
(74) *Attorney, Agent, or Firm* — Novak Druce Connolly Bove + Quigg LLP

(57) ABSTRACT

Methods and devices for obtaining authorization for a requestor to access a service are provided. In accordance with one embodiment, there is provided a method comprising receiving a requestor request for access to a service; sending an authorization request to one or more mobile devices associated with one or more authorizers on a first approval list; receiving an authorization response from the one or more mobile devices associated with the one or more authorizers on the first approval list; determining whether a predetermined level of authorization is received; and when the predetermined level of authorization is received, authorizing access to the service.

15 Claims, 3 Drawing Sheets

(56) References Cited

OTHER PUBLICATIONS

Dispensa, Steve, "Tokenless Two-Factor Authentication: It Finally Adds Up", PhoneFactor whitepaper, online: <http://www.phonefactor.com/wp-content/pdfs/PhoneFactor-WhitePaper.pdf>.

Di Pietro, "A Two-Factor Mobile Authentication Scheme for Secure Financial Transactions", Proceedings of the International Conference on Mobile Business, 2005, pp. 28-34 (abstract only).

Herrera-Joancomarti, "A Personal Authentication Scheme Using Mobile Technology", online <http://citeseerx.ist.psu.edu/viewdoc/summary?doi=10.1.1.61.6515> (abstract only).

Tham, "Ubiquitous Authorization Scheme Based on Device Profile", Emerging Directions in Embedded and Ubiquitous Computing, Lecture Notes in Computer Science, 2006, vol. 4097/2006, 312-321 (abstract only).

International Preliminary report on on Patentability and Written Opinion mailed Apr. 9, 2013, in corresponding PCT patent application No. PCT/US2011/054754.

* cited by examiner

METHOD OF OBTAINING AUTHORIZATION FOR ACCESSING A SERVICE

TECHNICAL FIELD

The present disclosure relates to the field of authorization systems, and more particularly to the field of authorization systems using mobile devices.

BACKGROUND

When accessing different services, users are often required to authenticate themselves by providing credentials such as a username and password, or by presenting a token such as a health care card. In some situations, to prevent unauthorized access, a user is required to present a token and enter a password. For example, when accessing a bank machine, a user is required to present a bank card and a secret personal identification number (PIN).

With the increasing number of services available online or through electronic databases, and the growing ubiquity of mobile devices, it would be advantageous to provide a system for authorizing access to a service using mobile devices.

BRIEF DESCRIPTION OF THE DRAWINGS

Like reference numerals are used in the drawings to denote like elements and features.

DETAILED DESCRIPTION OF EXAMPLE EMBODIMENTS

In accordance with one aspect of the present disclosure, there is provided a method of obtaining authorization for a requestor to access a service. The method includes receiving a requestor request for access to a service; sending an authorization request to one or more mobile devices on a first approval list associated with the service; receiving an authorization response from the one or more mobile devices on the first approval list; determining whether a predetermined level of authorization is received; and when the predetermined level of authorization is received, authorizing access to the service.

In accordance with another aspect of the present disclosure, there is provided a method of providing authorization for a requestor to access a service from a user associated with a mobile device. The method includes receiving an authorization request from a server; displaying an authorization request notification on the mobile device; receiving a user input in response to the authorization request; and sending an authorization response to the server.

In accordance with yet another aspect of the present disclosure, there is provided a method of providing authorization for a requestor to access a service from a mobile device associated with the requestor. The method includes receiving an authorization request from a server; displaying an authorization request notification on the mobile device; receiving a requestor input in response to the authorization request notification; and sending an authorization response to the server.

In another aspect, the present disclosure describes a server for obtaining authorization for a requestor to access a service. The server includes a processor; memory; and an authorization module which, when executed by the processor, configures the processor to receive a requestor request for access to a service, send an authorization request to one or more mobile devices on a first approval list associated with the service and the requestor, receive an authorization response from the one or more mobile devices on the first approval list, determine whether a predetermined level of authorization is received, and when the predetermined level of authorization is received, authorize access to the service.

In yet another aspect, the present disclosure describes a mobile device configured to provide authorization for a requestor to access a service. The mobile device includes a processor; a memory; an authorization module which, when executed by the processor, configures the processor to receive an authorization request from a server, output an authorization request notification on the mobile device, receive a user input in response to the authorization request, and send an authorization response to the server.

Figure 1:
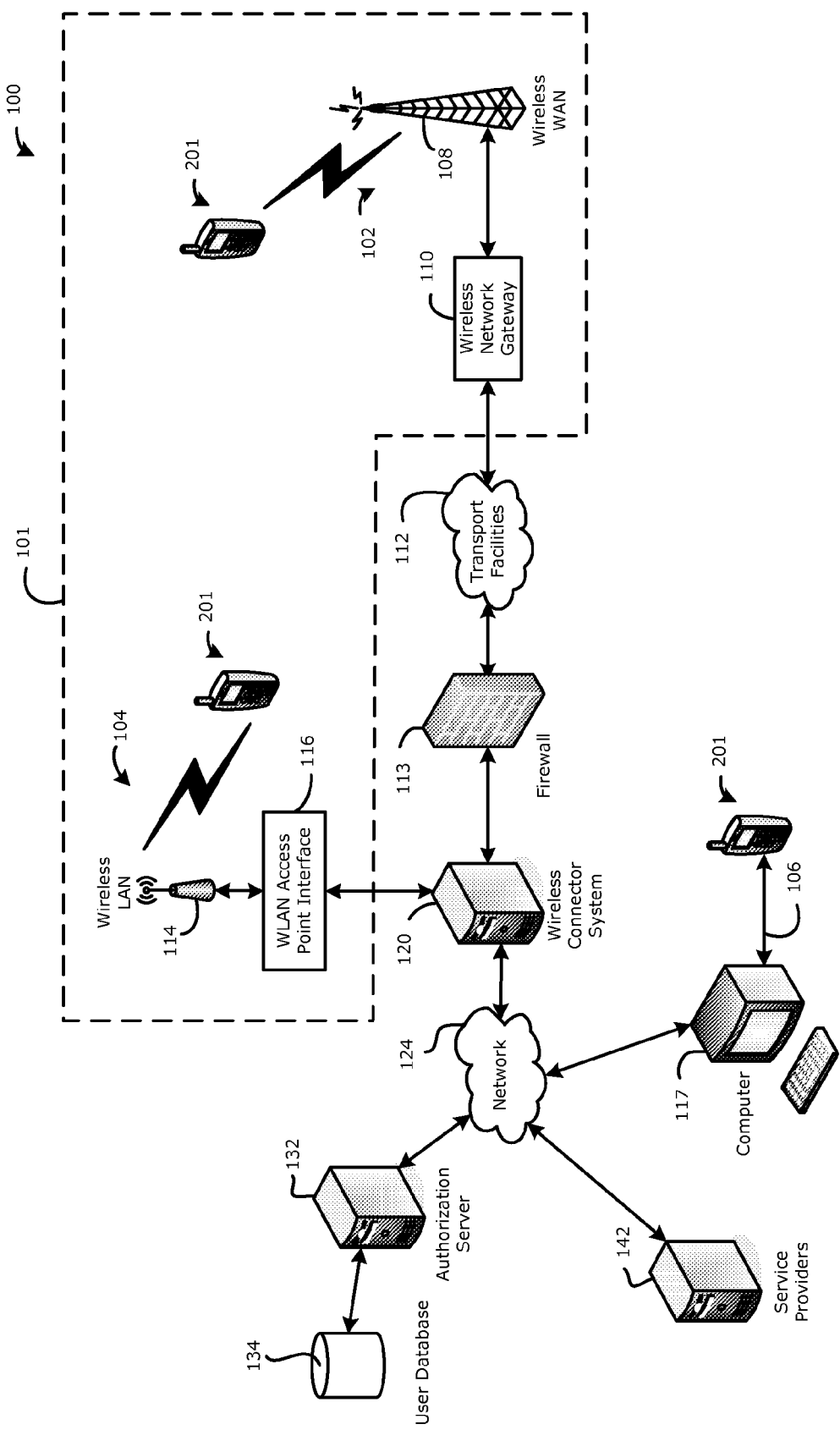
FIG. 1 is a block diagram illustrating a communication system including a mobile communication device in which example embodiments of the present disclosure can be applied.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as an authorization server 132, and service providers 142. The service providers 142 may comprise a content server for providing content such as internet content or content from an organization's internal servers to the mobile communication devices 201 in the wireless network 101, an application server for implementing server-based applications, or any other system for providing services. These service providers 142 can provide the services which a user may wish to access.

In accordance with one aspect of the present disclosure, the authorization server 132 is configured to obtain authorization for a request to access a service. In at least one embodiment, the authorization server 132 is implemented through computer program instructions that reside on a persistent storage on a computer system or server, and which are executed by one or more microprocessors. In some embodiments, the authorization server 132 is implemented on the same computer as a service provider 142.

In an example embodiment, the authorization server 132 can communicate and exchange messages with mobile devices over the communication system 100 using any of the example mobile device connections illustrated in FIG. 1 or any other connection means suitable for exchanging messages with a mobile device. In some embodiments, the authorization server 132 is configured to send and receive messages in the form of authorization requests and responses exchanged with various mobile devices. These messages may be, for example, SMS (short message service) or MMS (multimedia messaging service) messages, voice messages, email messages, or any other information exchange provided by a messaging or communication system. In some embodiments, these messages may be signed, encrypted or otherwise secured.

In some embodiments, the authorization server 132 comprises a user database 134. In some examples, the user database 134 comprises user entries which may include usernames and mobile devices associated with a particular user, access lists which may include blacklists and whitelists to indicate which users are precluded from or are permitted to access a service, and approval lists to indicate which users may grant authorization to access a service. The user database 134 may be part of a global address book comprising electronic contact records along with various authority hierarchies and access permissions. New users or users wishing to access a new service may have to register their mobile devices and usernames with the user database 134.

In some embodiments, there may be multiple authorization servers 132 wherein different authorization servers 132 are configured to obtain authorization for different services. There may also be multiple user databases 134 to correspond to different services. In other embodiments, there may be a single authorization server 132 and user database 134 to obtain authorization for a plurality of different services.

In FIG. 1, the authorization server 132 is illustrated as a separate system at a different location on the network than the service providers 142; however, in some embodiments, the authorization server 132 may be on the same computer or system as the service providers 142. In some embodiments, there may be no distinct authorization server 134, and the authorization methods described herein may be performed directly by the application or content server providing the services to which a user is requesting access.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the authorization server 132, service providers 142 or other connected computers 117. Conversely, the wireless connector system 120 sends data packets received, for example, from the authorization server 132 or service providers 142 to the wireless network gateway 110 which then transmit the data packets to the destination mobile device 201. The AP interfaces 116 of the WLAN 104 provide similar sending functions between the mobile device 201, the wireless connector system 120 and network connection point such as a content server, an application server or any other service provider 142.

The network 124 may comprise a private local area network, metropolitan area network, wide area network, the public internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be required. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile device 201 may alternatively connect to the wireless connector system 120 using a computer 117 via the network 124. In at least some embodiments, for security purposes the computers 117 with which the mobile devices 201 can connect to the wireless connector system 120 are limited to computers 117 which are directly connected to the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
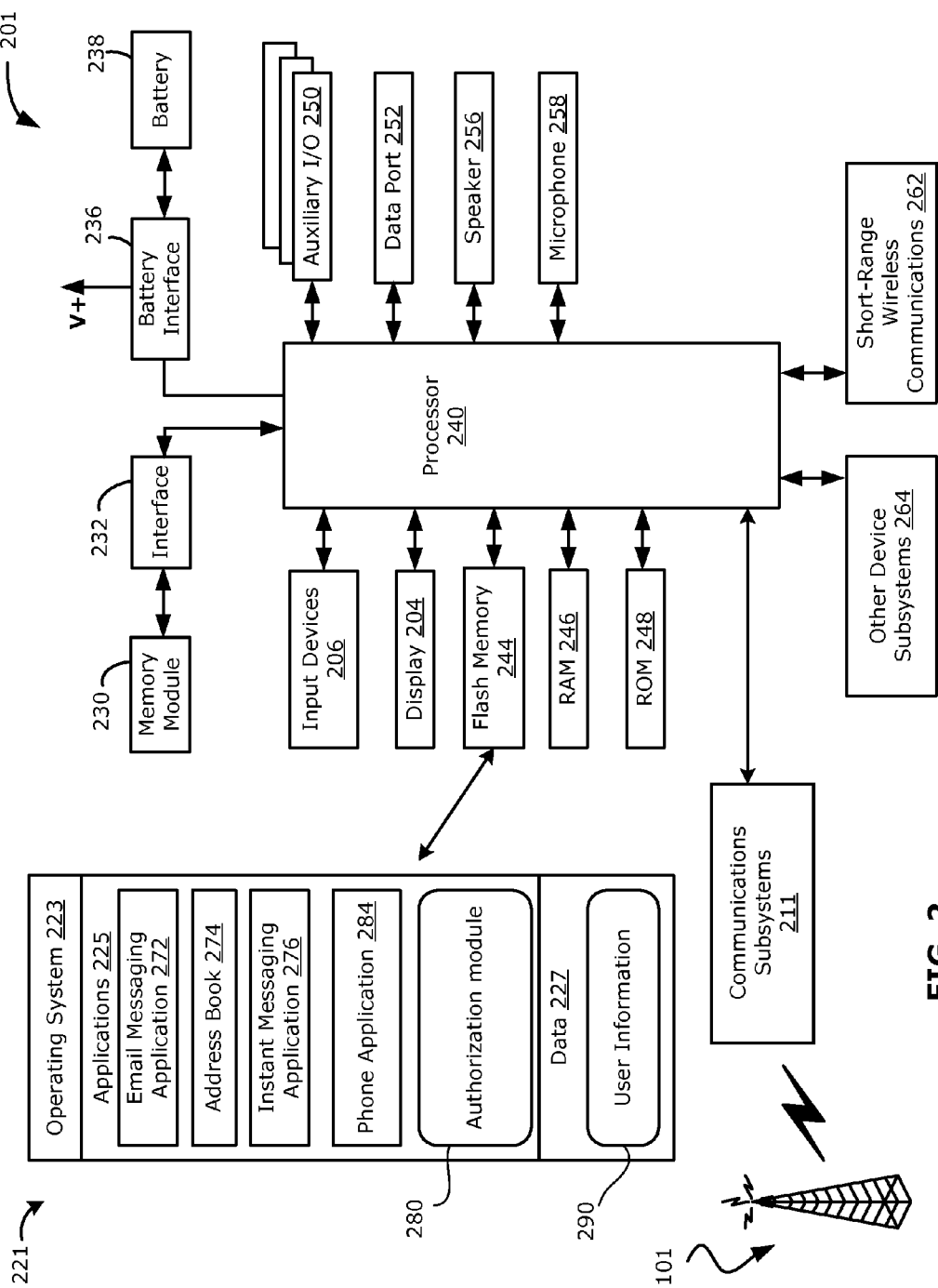
FIG. 2 is a block diagram illustrating a mobile communication device in accordance with one example embodiment of the present disclosure.

Reference is now made to FIG. 2 which illustrates a mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The mobile device 201 may communicate with any one of a plurality of fixed transceiver base stations 108 (FIG. 1) of the wireless network 101 within its geographic coverage area. The mobile device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223 and software applications 225, which may include an email messaging application 272, an address book 274, an instant messaging application 276, a phone application 284, and an authorization module 280. In some example embodiments, the functions performed by each of the applications 272, 274, 276, 284 and 280 may each be realized as a plurality of independent elements, and any one or more of these elements may be implemented as parts of other software applications 225. In some example embodiments, one or more applications 225 are configured to receive authorization requests from an authorization server 132 (FIG. 1), and to send authorization responses to the same authorization server 132 (FIG. 1).

For illustration purposes, FIG. 2 shows an authorization module 280. In some example embodiments, the authorization module 280 may be configured to receive authorization requests over the communications subsystem 211, display an authentication request notification, receive a user input in response to the authorization request, and format and send an authorization response to the authorization server 132. In some embodiments, the authorization requests and responses are sent and received as email messages, voice messages, instant messaging or text messages, or any other established message format. In other embodiments, the authorization requests and responses are sent using separate communications modules or systems implemented specifically for handling authorization messages.

In some embodiments, the authorization module 280 may be configured to receive authorization requests in the form of cryptographic challenges over the communication subsystem 211 and to send authorization responses in the form of cryptographic responses. The cryptographic challenges and responses can use well known public key techniques such as random number signing or symmetric key exchanges. In some embodiments, a cryptographic challenge response may be used alone or in combination with user input. In some embodiments, the authorization module 280 is configured to store unique keying information upon provisioning of the mobile device 201. The unique keying information may be stored in the flash memory 244 with the authorization module 280, with the user information 290, or in a separate keystore. The unique keying information is the basis for responding to cryptographic challenges.

In some embodiments, the authorization module 280 may be further configured to receive information requests and to send corresponding information responses to the service providers 142 or the authorization server 132.

Although the authorization module 280 is shown as an individual module or application, those of ordinarily skill in the art will appreciate that in many embodiments the functions of the authorization module 280 described above and detailed further below may be implemented within individual applications, such as the email messaging application 272 or within the operating system 223 and not necessarily using a separate module or application. The present application contemplates all such implementations.

In some embodiments, the authorization module and/or the unique keying information may be stored in a removable memory module 230 or on a Subscriber Identity Module (SIM) card.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card 230 (typically comprising flash memory) and a memory card interface 232. Network access typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The data 227 stored in memory (volatile or non-volatile) may include user information 290. In some embodiments, the user information 290 comprises data relating to the user associated with the mobile device 201. For example, the user information may include a user's address, phone number, health card number, credit card number and the like.

In some embodiments, some of the user information 290 may be sent by the authorization module 280 to a service provider 142 in response to an information request as will be described herein.

The serial data port 252 may be used for synchronization with a user's host computer system (not shown). The serial data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

Figure 3:
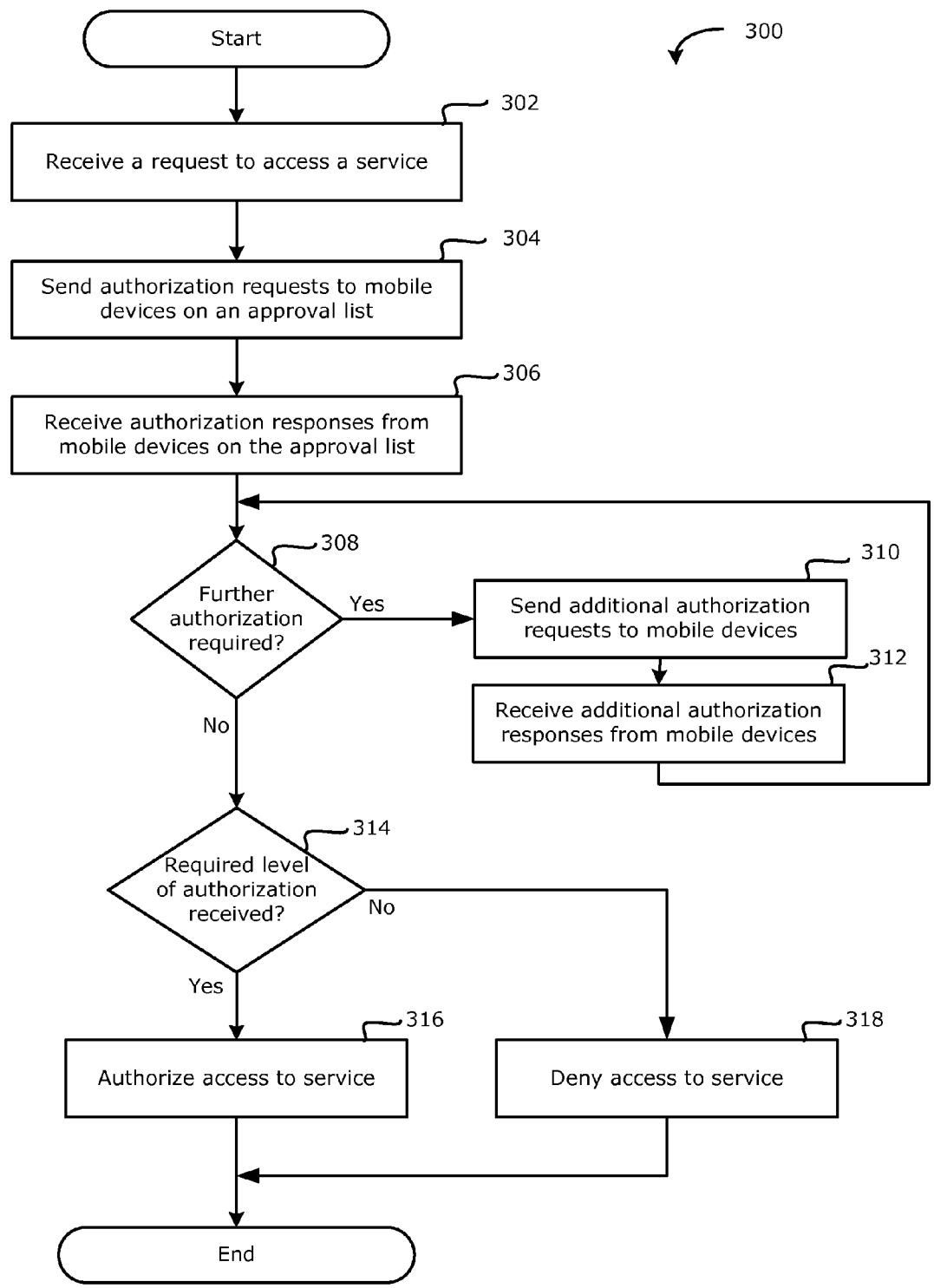
FIG. 3 is a flowchart illustrating an example method of obtaining authorization to access a service in accordance with one example embodiment of the present disclosure.

Reference is now made to FIG. 3, which shows, in flow-chart form, a method 300 of obtaining authorization from an authorization server to access a service.

The method 300 begins with receipt of a request to access a service in operation 302. The request is received by the authorization server 132 from the service provider 142. This request is triggered by an attempt by a requestor to access a service provided by the service provider 142. In attempting access, the requestor generally verifies his identity by entering his username and, in some cases, a password. In some embodiments, upon verification of the requestor's identity, a requestor request message is sent from the service provider 142 to the authorization server 132 indicating the requestor and the service to which access is being requested. In some embodiments, the service provider 142 and the authorization server 132 are part of the same system, so receipt of a requestor's request to access a service directly triggers the authorization module.

In some embodiments, the requestor may have registered his credentials including his name and a mobile device in his possession with a service provider 142 or authorization server 132. In these embodiments, the requestor may request access to a service by entering only his username or unique identifier. In this approach, the requestor's identity can be verified via an authorization request as discussed herein. The credentials registered with the service provider 142 or authorization server 132 may include a username or identifier and contact information for at least one mobile device associated with the username or identifier. The contact information may include an email address, phone number, SIP URI, PIN number, or other address information for contacting the mobile device.

Upon receipt of a requestor request to access a service, the authorization server sends authorization requests to one or more mobile devices on an approval list 304. The approval list is stored on or generated from the user database 134 and comprises a list of authorizers who may be queried to authorize access to the service. Each authorizer entry is associated with one or more mobile devices from which the authorizer's permission may be requested.

In some embodiments, the approval list is specific to the requestor and the service and each requestor may have a different approval list. In some embodiments, the approval list is independent from the requestor and is based on the service to which access is being requested. In some embodiments, the requestor is included on the approval list, and an authorization request is sent to his mobile device to verify his identity and/or his request to access the service.

As described above, authorization requests can be in the form of email, voice, instant or text messages. In some embodiments, authorization messages may be in message formats specific to authorization modules installed on the authorization server 132 and the mobile devices.

In some embodiments, the authorization server 132 can be configured to broadcast authorization requests to mobile devices associated with all the authorizers on the approval list. In some embodiments, the authorization server 132 can be configured to send authorization requests to a subset of the mobile devices associated with the authorizers on the approval list, and subsequently to other associated mobile devices if an insufficient number of responses are received from the initial subset of mobile devices.

In step 306, the authorization server 132 receives authorization responses from the mobile devices in response to the authorization requests. These authorization responses can comprise only a positive or a negative response. In some embodiments, an authorization response can further comprise information containing the authorizer's reasons for the positive or negative response.

The authorization responses are generated by a mobile device when an authorizer provides input in response to the authorization request. When the authorization request is first received by the mobile device 201 via one of the aforementioned messaging systems, the authorization module 280 configures the processor 240 to output an authorization request notification to the authorizer. This notification can be in the form of an audio signal such as a ring or chime, a visual signal such as a flashing LED, or a visual message or indicator displayed on the device display 204. The mobile device 201 can be further configured to convey to the authorizer the identity of the requestor, the service to which access is being requested and any other information in the authorization request. The mobile device 201 can receive a user input from the authorizer to allow or deny the request. In some embodiments, the authorizer can also input or select a reason for his decision. The mobile device 201 then formats and sends an authorization response to the authorization server 132.

In some embodiments, before an authorizer can provide a response to an authorization request, he must verify his identity on the mobile device. This verification may be done by entering a secret such as a password associated with the service, entering a password associated with the mobile device, or providing biometric identification such as a fingerprint scan or voice recognition. In some embodiments, a camera may be used to verify an authorizer using face recognition techniques or retinal scans.

Upon receipt of an authorization response 306, the authorization server 132 can be configured to determine whether a further authorization request is required 308. In accordance with an aspect of the present disclosure, further authorization requests can be required when there is a hierarchy of authorizers. For example, when a requestor requests access to a service, he may need authorization from the vice president of his department; however, before the VP can authorize access, the requestor's department manager may have to approve access. In this example, the authorization server 132 can be configured to send an authorization request to his manager who is on the first approval list. Upon receipt of a positive authorization response from the manager, the authorization server 132 can then send an additional authorization request 310 to the VP or any other authorizers who are on a second approval list. The authorization server 132 is also configured to receive additional authorization responses 312 to these requests.

In another example, when a requestor requests access to a service, he may require authorization from his manager; however, the manager may wish to delegate his authority to an IT (information technology) administrator who may have better knowledge of potential security issues associated, with the service. In this example, the manager is included on the first approval list and his mobile device receives an authorization request. Upon receiving this request, the manager provides input indicating that he is delegating his authority to the IT administrator. The authorization module 280 on his mobile device 201 includes a delegation request containing his choice of delegate with the authorization response. Upon receipt of the delegation request, the authorization server can verify that the delegate has sufficient authority to authorize access to the service. Upon verification, the authorization server 132 sends an authorization request to a mobile device associated with the delegate and to receive a corresponding authorization response.

After receiving a number of authorization responses, the authorization server 132 is configured to determine whether a required level of authorization has been received 314 before authorizing access to a service 316. For example, a predetermined level of authorization may be received when a specific number or percentage of authorizers on the approval list have responded positively. In another example, a predetermined level of authorization may be received when positive responses have been received from the requestor's mobile device as well as another authorizer on the approval list. In yet another example, a predetermined level of authorization may be received when a predetermined number or percentage of authorizers on a first approval list and a predetermined number or percentage of authorizers on a second approval list have responded positively.

In another embodiment, a predetermined level of authorization may not be denied if a maximum threshold of negative responses is reached first. For example, if a predetermined number of positive responses have not been received, the authorization server 132 can be configured to deny access to the service 318 when a predetermined number of negative responses are received regardless of the number of subsequently received positive responses.

In some embodiments, the requestor may be denied access to the service if too much time has elapsed before a predetermined level of authorization is received.

In some embodiments, the authorization server 132 can be configured to broadcast to all mobile devices on the approval list a message indicating when access to the service has been granted or denied.

In another aspect of the present disclosure, once a requestor has been granted access to a service, the requestor's mobile device can be configured to provide information about the requestor to the service. For example, if a requestor has requested access to a health care service and has been granted authorization by the authorizers on the associated approval list such as his doctor, the requestor may need to provide additional information to the health care service such as his health card number or his medical history. Instead of verbally or manually providing this information to the health care service provider, if this information is stored on the requestor's mobile device, the required information can be transferred from the requestor's mobile device to the service provider.

In some embodiments, once a requestor has been authorized to access a service, the service or the authorization server may be configured to send an information request to a mobile device associated with the requestor. Upon receipt of the information request, and if the requested information is available on the requestor's mobile device, the information is sent from the mobile device to the service or authorization server in the form of an information response.

In some embodiments, the mobile device is configured to prompt the requester to confirm what information if any to send to the service. If the information is not stored on the mobile device, the mobile device can be configured to request the information from the requestor. In some embodiments, the mobile device is configured to request verification of the requestor's identity, such as by requesting a password, before sending the information response.

While the present disclosure is primarily described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of obtaining authorization for a requestor to access a service comprising:
   receiving a requestor request for access to a service;
   sending an authorization request to one or more mobile devices associated with one or more authorizers on an approval list;
   receiving an authorization response from the one or more mobile devices associated with the one or more authorizers on the approval list;
   determining from the authorization response that a predetermined level of authorization is received;
   when the predetermined level of authorization is received, authorizing access to the service, wherein the predetermined level of authorization is received when a percentage of positive authorization responses from mobile devices on the approval list have been received, and
   broadcasting an authorization notification to the mobile devices on the approval list;
   wherein a plurality of mobile devices are on the approval list and wherein sending the authorization request further comprises:
   sending the authorization request to an initial subset of the plurality of mobile devices; and
   when an insufficient response is received from the initial subset, sending the authorization request to a second subset of the plurality of mobile devices.

2. The method of claim 1 further comprising:
   sending an authorization request to one or more mobile devices associated with one or more authorizers on a second approval list; and
   receiving an authorization response from the one or more mobile devices associated with the one or more authorizers on the second approval list.

3. The method of claim 1 further comprising when the authorization response includes a delegation request,
   verifying the authority level of one or more delegates in the delegation request;
   sending an authorization request to one or more mobile devices associated with the verified one or more delegates; and
   receiving an authorization response from the one or more mobile devices associated with the verified one or more delegates.

4. The method of claim 1 wherein sending the authorization request comprises sending a cryptographic challenge to the one or more mobile devices; and
   wherein receiving the authorization response comprises receiving a cryptographic response from the one or more mobile devices.

5. The method of claim 1 wherein sending an authorization request comprises sending a text message, voice message or email to the one or more mobile devices on the approval list.

6. The method of claim 1 further comprising:
   sending an authorization request to a mobile device associated with the requestor; and
   receiving an authorization response from the mobile device associated with the requestor;
   wherein a predetermined level of authorization requires receipt of a positive authorization response from the mobile device associated with the requestor.

7. The method of claim 6 wherein sending the authorization request to the mobile device associated with the requestor comprises sending a cryptographic challenge to the mobile device associated with the requestor; and
   wherein receiving the authorization response from the mobile device associated with the requestor comprises receiving a cryptographic response from the mobile device associated with the requestor.

8. The method of claim 1, wherein when an authorization is received within the predefined time limit from the sending, further comprising:
   sending an information request to a mobile device associated with the requestor; and
   receiving an information response including requestor information from the mobile device associated with the requestor.

9. A server for obtaining authorization for a requestor to access a service comprising:
   a processor;
   a memory; and
   an authorization module which, when executed by the processor, configures the processor to:
   receive a requestor request for access to a service;
   send an authorization request to one or more mobile devices on an approval list associated with the service and the requestor;
   receive an authorization response from the one or more mobile devices on the approval list;
   determine whether a predetermined level of authorization is received;
   when the predetermined level of authorization is received,
   authorize access to the service, wherein the predetermined level of authorization is received when a percentage of positive authorization responses from mobile devices on the approval list have been received, and
   broadcast an authorization notification to the mobile devices on the approval list;

wherein a plurality of mobile devices are on the approval list and wherein sending the authorization request further comprises:
   sending the authorization request to an initial subset of the plurality of mobile devices; and
   when an insufficient response is received from the initial subset, sending the authorization request to a second subset of the plurality of mobile devices.

10. The server of claim 9, wherein the processor is further configured to:
   send an authorization request to one or more mobile devices associated with one or more authorizers on a second approval list; and
   receive an authorization response from the one or more mobile devices associated with the one or more authorizers on the second approval list.

11. The server of claim 9 wherein when the authorization response includes a delegation request, the processor is further configured to
   verify the authority level of one or more delegates in the delegation request;
   send an authorization request to one or more mobile devices associated with the verified one or more delegates; and
   receive an authorization response from the one or more mobile devices associated with the verified one or more delegates.

12. The server of claim 9, wherein the processor is further configured to send a cryptographic challenge to the one or more mobile devices; and
   receive a cryptographic response from the one or more mobile devices.

13. The server of claim 9 wherein the authorization request is any of a text message, voice message or email sent to the one or more mobile devices on the approval list.

14. The server of claim 9, wherein the processor is further configured to:
   send an authorization request to a mobile device associated with the requestor; and
   receive an authorization response from the mobile device associated with the requestor;
   wherein a predetermined level of authorization requires receipt of a positive authorization response from the mobile device associated with the requestor.

15. The server of claim 14 wherein sending the authorization request to the mobile device associated with the requestor comprises sending a cryptographic challenge to the mobile device associated with the requestor; and
   wherein receiving the authorization response from the mobile device associated with the requestor comprises receiving a cryptographic response from the mobile device associated with the requestor.

* * * * *